(12) United States Patent
Cesnik et al.

(10) Patent No.: US 9,247,726 B2
(45) Date of Patent: Feb. 2, 2016

(54) ANTI-BIRD GLASS AND METHOD OF ITS PRODUCTION AND USE

(75) Inventors: Gerhard Cesnik, Klagenfurt (AT);
Simon Remschnig, Liebenfels (AT);
Hans-Joachim Arnold, Remshalden (DE); Guenther Arnold, Berglen-Oppelsbohm (DE); Franz Krampl, Velden am Woerther See (AT)

(73) Assignee: Isolar Isolierglaserzeugung GmbH, Klagenfurt (AT)

( * ) Notice: Subject to any disclaimer, the term of this patent is extended or adjusted under 35 U.S.C. 154(b) by 537 days.

(21) Appl. No.: 13/479,883

(22) Filed: May 24, 2012

(65) Prior Publication Data

US 2013/0087720 A1   Apr. 11, 2013

(30) Foreign Application Priority Data

May 25, 2011  (DE) .................. 10 2011 103 132

(51) Int. Cl.
*A01M 29/08*  (2011.01)
(52) U.S. Cl.
CPC ..................................... *A01M 29/08* (2013.01)
(58) Field of Classification Search
None
See application file for complete search history.

(56) References Cited

U.S. PATENT DOCUMENTS

| | | | |
|---|---|---|---|
| 2004/0011997 A1 * | 1/2004 | Rogers et al. | ........... 252/301.4 F |
| 2007/0190343 A1 | 8/2007 | Arkles | |

FOREIGN PATENT DOCUMENTS

| | | |
|---|---|---|
| DE | 100 19 068 A1 | 10/2001 |
| DE | 103 50 529 A1 | 3/2005 |
| DE | 10 2005 061 854 A1 | 12/2007 |
| DE | 10 2007 028 543 A1 | 3/2008 |
| DE | 10 2007 036 739 A1 | 2/2009 |
| DE | 102010019349 A1 * | 11/2011 |
| EP | 1 110 450 B1 | 6/2001 |

OTHER PUBLICATIONS

English translation of DE 102010019349 A1, Nov. 2011.*
Machine translation of DE 102007028543 A1, Feb. 2009.*
German Patent Office Search Report, DE102011103132.8, Nov. 29, 2011, 8 pages, and English translation thereof, 8 pages.
German Patent Office Search Report, DE102011103132.8, Mar. 24, 2015, 5 pages, and English translation thereof, 5 pages.

* cited by examiner

*Primary Examiner* — Ramsey Zacharia
(74) *Attorney, Agent, or Firm* — Wood, Herron & Evans, LLP (57) ABSTRACT

The present invention relates to a pane element with a protective device against bird strikes, whereby a protective structure is arranged on the outer area of a pane element which structure absorbs light in the wavelength range of approximately 320 nm to 420 nm, in particular at approximately 350 nm to 380 nm and emits by Stokes shift on the longer wave range, in particular in the UV range or near UV range into the visible wavelength range and is visible as a hindrance for a bird that cannot be flown through and is largely not visible to the human eye or seems translucent or can be recognized as an anti-bird structure, and relates to a method for the production and the use for avoiding the injuring or killing of birds.

10 Claims, 6 Drawing Sheets

Fig. 4  ESG, TVG

Nanoscale luminescent pigment
3-30 nm with excitation in the 3-10 nm
UV range e.g., ZnO with Stokes shift

ANTI-BIRD GLASS AND METHOD OF ITS PRODUCTION AND USE

FIELD OF THE INVENTION

The invention relates to an anti-bird device against bird strikes on largely transparent panes.

BACKGROUND OF THE INVENTION

The term "transparent pane" denotes here window and door elements as well as facade elements, separating walls, roof elements, anti-noise elements and such transparent, pane-like, flat or curved elements based on single-pane safety glass (ESG) or partially prestressed glass (TVG) or thermally treated glass (TBG) or composite safety glass (VSG) or insulating glass.

The term "bird strike" denotes the impact of a bird against such a pane, whereby the bird can be injured, which should be avoided by the protective device of the invention, and even the pane element can suffer damage by the force of the impact.

In order to avoid bird strikes, elements that are clearly visible to the human eye are customarily mounted on such pane-like glass fronts. In order to avoid pane damage, safety glass constructions or composite glass constructions or pane constructions with worked-in fibers or with grid-like elements are frequently used. Often, such fibers or grid-like elements are designed to be visually seen so that in addition to the strength even a visual warning is given.

EP 1 110 450 B1 cites an anti-bird device for a transparent substance which device has a greater absorption capacity and/or reflection capacity in a wavelength range that borders on the wavelength range visible for humans than in the visible range. Alternatively, the polarization of the light is altered.

DE 20215573 U1 and EP 1 319 335 B1 cite an anti-bird device for a transparent substance that has a main dimension (H) of less than 0.5 mm as an optically effective structure. This yields an undesired visibility for the human eye.

WO 2004 070 148 A2 cites an anti-bird device with a glass pane or plastic pane onto which or into which a screen that can be perceived by birds is worked in whose dimensions are in the μm range so that a pane transparency desired to a great extent for the human eye remains preserved.

The screen is preferably printed onto the pane on one side and has a punctual structure or a grid structure. The diameter of the points of the punctual screen is in the range of 10 to 100 μm, preferably 50 μm, whereby in the grid screen the line width is approximately 10 to 100 μm, preferably approximately 5 μm, and the mesh width is approximately 100 to 500 μm, preferably approximately 300 μm. The anti-bird screen is preferably colored black. However, this arrangement has the disadvantage that the slight contrast between the transparent range of the pane and the screen structure that is given for the eye of the birds results in an increased danger of impact.

The invention therefore has the basic task of improving the contrast effect of the anti-bird device for the bird's eye, whereby the transparency should be largely retained for the human eye.

SUMMARY OF THE INVENTION

The problem is solved by the technical teaching of the independent claims 1 and/or 2.

The technical teaching given makes it possible for the first time to economically produce a protective device against bird strikes on pane elements of glass, in particular of insulating glass or of single-pane safety glass (ESG) or partially prestressed glass (TVG) or thermally treated glass (TBG) or composite safety glass (VSG) that offers a significantly improved contrast for the bird's eye because the emission of the anti-bird screen takes place in a wavelength range that appears in color for the bird's eye.

Therefore, the bird no longer sees the anti-bird screen known from the prior art only in black and white but rather in color. The color impression produced with the teaching of claim 1 is in the blue range while the color impression produced with the teaching of claim 2 is in the greenish, yellow or orange range.

Inorganic glass panes have a filter effect below approximately 350 nm. Acrylic glass panes, that is, organic polymeric panes, have, similar to quartz glass, a UV permeability up to approximately 200 nm.

According to our present state of knowledge birds can see well in the UV-A range of approximately 315 nm to 380 nm, especially in the range of 370 nm or in the range of 420 nm. The range 320 to 400 nm is designated colloquially as black light.

The invention is based on the recognition that the vision of most bird types is based on four cone types, which, in contrast to three cone types in humans, results in a vision in the ultraviolet (UV) wavelength range, typically in a range of 370 nm.

According to the dissertation "Sehleistung des Vogelauges" [German: "Seeing Power of the Eye of a Bird"] by Kristin Steigerwald, Bird Clinic, Ludwig Maximilian University of Munich, working area Ophthalmology, director: Univ. Prof. Dr. R Korbel, Munich 2006 http://edoc.ub.uni-muenchen.de/6793/1/Steigerwald_Kristin_S.pdf, the problem of bird collision victims with window panes is cited on page 247 and the use of so-called "bird stripes", that is, the attaching of contrast-rich vertical adhesive stripes, is cited as being unreasonable from an architectural and esthetic viewpoint.

As an alternative, the attaching of ultraviolet-absorbing and reflecting layers on the glass is cited that are visible and a warning for a bird and at the same time invisible and therefore esthetic for a human.

However, the mere reflection of the UV light in the anti-bird structure does not result in a sufficient contrast with the other permeable areas of the pane.

It is furthermore explained that the ultraviolet sensitivity in the bird population is not uniformly expressed and that the ultraviolet color has a varying attractive or rejecting effect on the birds as a function of whether they are fruit eaters or insectivores. It is pointed out that sufficient UV emission is necessary in daylight for already warning the birds at a certain approach distance.

The reflection of a window in the UV wavelength range, that is, the UV reflectivity of the window, is not sufficient as a contrast for protection against birds. The window must have the highest possible contrast structure when using the UV sensitivity of the bird—analogous to a UV-reflective spider web relative to a contrast-rich UV-absorbing (green) background vegetation.

This is where the invention begins, that makes use of the recognition that there is also the effect of luminescent radiation in addition to the effects of absorption and of reflection.

Accordingly, the excitement of the protective structure by daylight photons (photoluminescence) is concerned, which photons lead either to a fluorescence or to a phosphorescence of the excited particles (pigments) in the protective structure.

Both effects are claimed as essential for the invention. For the sake of simplicity only the fluorescence of the protective structure is described in the following description. However, the invention is not limited to it but also claims the phosphorescence of the protective structure or of a combination of both effects.

The luminescent radiation generally takes place in accordance with Lambert's law and therefore even fine structures can be uniformly recognized from observation angles of almost 180°. In the present case luminescent pigments that can be activated in preferably UV or close to UV are used that emit light with a greater wavelength, preferably in the UV or close to the UV wavelength range in accordance with the Stokes shift.

Such UV-activatable luminescent pigments are used in the invention in the form of crystalline pigments with dimensions in the micrometer range or nanoscale pigments in the range of less than 1 to 30 nm. They are preferably structurally arranged on the outside of a glass pane in an inorganic binding agent matrix that is largely transparent for UV light as a graphic shape.

It is suggested in accordance with the invention that the protective structure be used on the outside of the glass by means of serigraphy or inkjet or aerosol jet or dispenser or roller coating with a structured roller (with a special structure) and that it be carried out in a first embodiment on the basis of a glass flux or glass frits, ink or paste, whereby luminescent pigments are worked into the transparent glass flux or into the transparent glass frit in a homogeneously dispersed manner, and that the luminescent pigments with 0.5 μm to 30 μm, in particular with 1 μm to 10 μm and quite especially with 1 to 5 μm average pigment dimension have an absorption in the UV- or near UV range and an emission also in the UV- or near UV wavelength range.

Therefore, it is possible for the first time to significantly increase the UV emission of the anti-bird structure in daylight which also achieves an improved contrast to the transparent areas of the pane and in addition to the vegetative surrounding that appears green.

For example, the inner organic phosphorus Ciba® Xymara™ Marker LF2A pigment with a particle size D90 of 5 μm and an emission maximum at 452 nm at 366 nm excitation can be used as luminescent pigment.

In another embodiment the protective structure on the basis of a metallo-organic sol gel can be used.

Sol-gel methods are wet-chemical methods for the production of ceramic or ceramic-organic materials. These methods are used for the production of ceramic bulk materials; ceramic nanopowders and fibers as well as for the separation of homogeneous, nanocrystalline, oxide-ceramic or also ceramic-organic coatings. The particularity of sol-gel methods is that the production and/or separation of the materials starts from a liquid sol state that is converted by a sol-gel transformation into a solid gel state.

Dispersions of solid particles in the size range between 1 nm to 100 nm are designated as sols, that are extremely finely distributed (dispersed) in water or organic solvents. Sol-gel methods generally start from sol systems on the basis of metallo-organic polymers. The transition from the liquid sol to the ceramic material takes place via a gel state. During the sol-gel transformation a 3-dimensional cross-linking of the nanoparticles occurs in the solvent, as a result of which the gel obtains solid body qualities. The transferring of the gel into an oxidic ceramic material takes place by a controlled heat treatment under air by serigraphy or ink jet or aerosol jet or dispenser or roller coating with a structured roller with a special structure on the inside and/or outside of the glass.

The application takes place in the form of a metallo-organic sol-gel paste or ink with nanoscale luminescent pigments homogeneously dispersed in it with dimensions in the range of 1 nm to 100 nm, especially 2 nm to 30 nm, whereby the luminescent pigments have an absorption in the UV or near UV range and an emission also in the UV or near UV wavelength range.

A suitable agent comes from Sigma-Aldrich Lumidot CdS Quantum Dots 662429 (Producer: Nanoco) with a particle size of approximately 2.3 nm and a UV absorption of 350 to 370 nm and a UV emission in the range of 370 to 390 nm with a FWHM (full width at half maximum) of 20 nm and a quantum efficiency of approximately 50% (5 mg/ml in toluene; 10 ml 349€) or cadmium-free quantum nano-dots with the excitation and emission in the UC- or near UV range.

A suitable serigraphy paste is the article TLU 0050A of the Ferro company, that raises the reflection in the visible range by approximately 12% and in the UV range by approximately 30% and disperses in it.

The protective structure can be selected in the graphic form of a spider web or with structures in which the distance of printed elements is selected to be not greater than 30 mm and in particular not greater than 20 mm and the width of the printed elements is selected to be not less than 10% of the distance.

Geometrically equivalent or artistic or random structures can be selected.

In order to optimally design the protective device against bird strikes, the structure is arranged on the outside of the glass and care is taken that the highest possible contrast is present between UV light or a structure emitting light close to UV and with intermediate spaces that absorb UV. In order to increase this desired contrast the outside of the glass can be constructed to be coated in an anti-reflective manner and/or a composite safety glass (VSG) can be selected as outside glass, whereby the UV transmission is customarily reduced by increasing the thickness of the PVB sheet:

| Example: | *) 4 mm float glass - PVB sheet - 4 mm float glass **) 4 mm white flint - PVB sheet - 4 mm white flint *) | |
|---|---|---|
| 0.38 mm PVB | 2.4% | 1.9% transmission in the UV range |
| 0.76 mm PVB | 0.3% | 0.25% |
| 1.14 mm PVB | 0.1% | 0.10% |
| 1.52 mm PVB | 0.1% | 0.05% |
| 2.28 mm PVB | 0.1% | 0.003% |
| 8 mm glass | 48% | 80% |

A single, 4 mm thick float glass or lime soda silicate glass has a light permeability TL according to DIN 67507 of approximately 87% and in the non-coated case a reflection of approximately 8% (approximately 15% for an insulating glass consisting of 2 float glass panes), whereby a glass with an anti-reflection coating has reflection of approximately 0.5% to 1%. Two 4 mm float glasses have a UV transmission of approximately 43.3%. This UV transmission can be reduced by selecting a composite safety glass (VSG) consisting of two for example 4 mm float glass panes with a PVB intermediate sheet below 2.4% using a 0.38 mm thick PVB sheet down to under 0.50% when using two PVB sheets, that is, 2×0.38 mm=CO 76 mm PVB thick.

For a bird's eye with UV sensitivity such a VSG glass system largely absorbs the entire UV light and, given the arranging of a protective structure consisting of a luminescing protective structure emitting in the UV range or in the near UV range, this structure has a very high contrast between protective structure elements and the non-printed or coated glass surface and creates a high protection against bird strikes.

In addition to the luminescent effect of the protective structure a translucent, reflecting coloring of the protective structure can be created when using the serigraphic paste TLU 0050A of the Ferro company in a plurality of colored nuances by mixing with the Ferro system 140 that is preferably free of lead and cadmium.

With this Ferro 140 system colors of gold to sterling silver to bronze to red silver can be selected in different intensities and mixtures and a translucent to a largely opaque protective visualization in the wavelength range visible to the human eye can be realized.

The serigraphic paste is customarily applied with a layer thickness of 10 to 20μ in graphic form on the glass surface with serigraphy and dried at 120° C. to 150° C. within 5 to 10 minutes in an infrared or convection drier, whereby the layer thickness is then only 1 to 2μ and subsequently burned usually in the ESG process at approximately 620° C., which achieves a layer thickness of a few 50 to 400 nm. This very thin layer has the reflecting properties especially in the UV range and has an excellent outer glass resistance (weather resistance). High architectural and aesthetic demands are met by an appropriate graphic and coloring shaping of the protective structure.

All the above-cited features and descriptions for all details also apply to luminescent pigments with an anti-Stokes shift. Therefore, the technical teaching of claim 2 provides that in order to improve the contrast effect of the protective structure (3) for the bird's eye, luminescent pigments (16) are mixed into the graphically designed coating elements (11, 12, 13) which pigments absorb daylight in the wavelength range of approximately 780 nm to 1200 nm and emit in the shorter wave range, in particular in the green, orange or in the red wave range.

This also achieves an improvement of the contrast of the anti-bird structure relative to the non-coated areas of the glass and to the surroundings.

Of course, an anti-bird structure with a mixture of anti-Stokes and Stokes pigments is also possible. Likewise, different areas of the glass can be coated with an anti-bird structure with anti-Stokes pigments and other areas with Stokes pigments. The areas can alternate in the surface or can form different graphic shapes.

It is also possible to coat the outside of a pane that can be approached from both sides with one type of luminescent pigments while the other side is coated with the other type of luminescent pigments.

A few exemplary embodiments of the invention are described in detail in the following with reference made to the figures in the drawings. Other advantages and features of the invention are apparent from the drawings and the description.

DETAILED DESCRIPTION OF THE DRAWINGS

Figure 1:
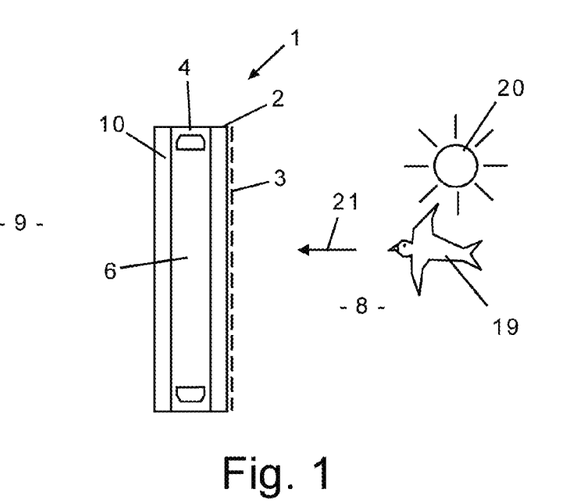
FIG. 1 schematically shows a pane element with a protective device against bird strikes designed as an insulating glass element.

FIG. 1 shows a pane element 1 with a protective device against bird strikes constructed as a hollow insulating glass element in which an outer pane element 2 and an inner pane element 10 are arranged in a frame-like insulating glass composite 4, whereby an inert gas 6 is filled into the intermediate space between both pane elements 2, 10.

According to the invention only the outer side of the outer pane element 2 is coated, printed or covered in some other way with a protective structure 3 against bird strikes.

A bird 19 flying in the direction of arrow 21 toward the pane 2 and which is consequently in the outer area 8 of the pane element 1 receives a colored impression from the protective structure 3 on the pane element 2 by excitation of the luminescent or phosphorescent pigments 19 with the aid of the sunlight 20.

Figure 2:
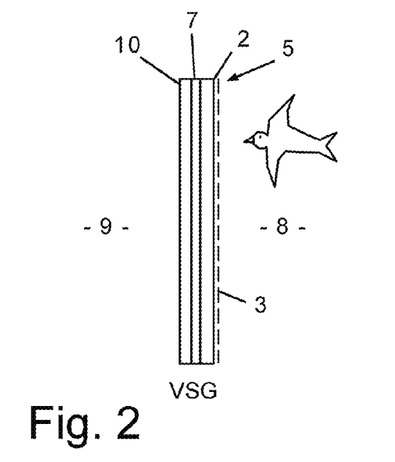
FIG. 2 shows a pane element with a protective device designed as a composite glass pane.
Figure 3:
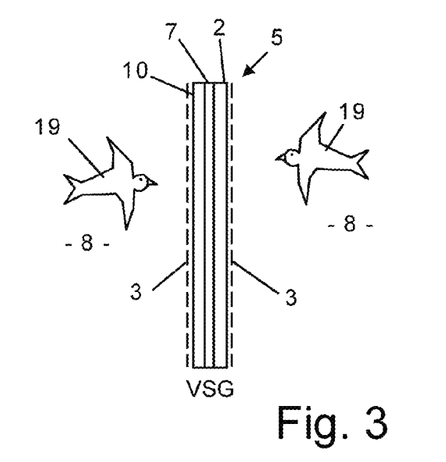
FIG. 3 shows the same construction as FIG. 2 but with a pane element coated on both sides.
Figure 4:
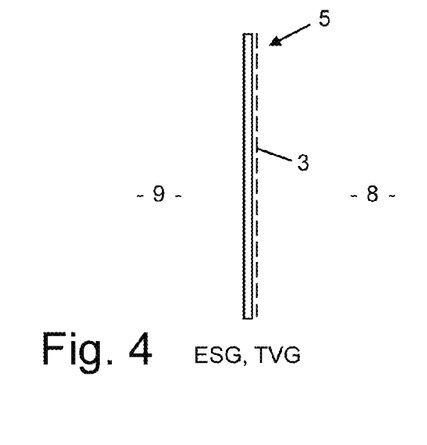
FIG. 4 shows a pane element consisting of an ESG or TVG safety glass composite.

FIGS. 2 to 4 show other pane elements for which pane elements the same explanations regarding the protective structure 3 and the ability to ward off the approach of birds 19 are described.

FIG. 2 shows an outer pane element 2 over a polymeric connecting element 7, e.g., a PVB sheet or a PVC sheet with the inner pane element 10 connected in a directly adhesive manner.

As is shown in FIG. 1, the outer pane element 2 carries the luminescent (or phosphorescent) protective structure 3.

FIG. 3 shows that not only the outer pane element 2 can have such a protective structure 3 on its outer side but that even the inner pane element 10 can be coated with such a protective structure.

Such a pane element according to FIG. 3 then does not separate between an outer space and an inner space but rather it stands free in an outer area.

On the other hand the pane elements according to FIGS. 1 and 2 separate an outer area 8 from an inner area 9.

This also applies to the pane element according to FIG. 4 that consists of a safety glass composite 5 that carries a structure 3 for protection against bird strikes on its outer pane element 2.

Figure 5:
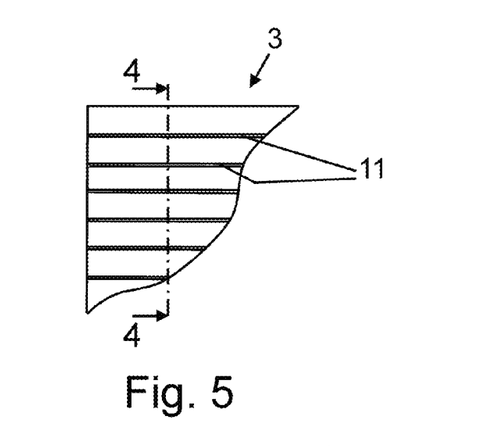
FIG. 5 shows an enlarged view of the protective structure in which coating elements in the form of stripes are applied.
Figure 6:
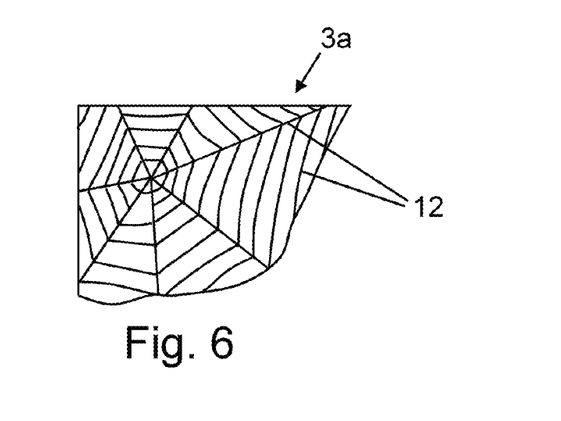
FIG. 6 shows a modification of FIG. 5 with the attaching of a protective structure in the form of a spider web.

Such a protective structure 3 can have different graphic shapes, as is described in detail using the FIGS. 5 and 6.

Figure 7:
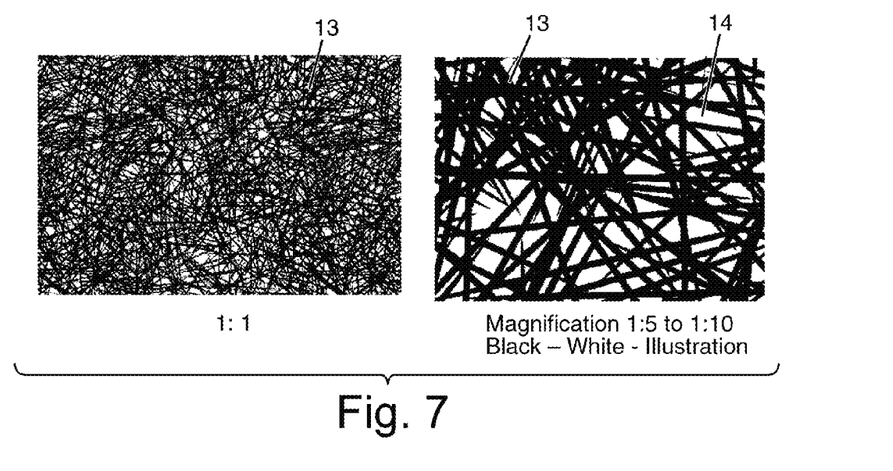
FIG. 7 shows another design for the graphic shaping of the coating structure in the form of a Mikado structure, and an enlarged view of the Mikado structure in a magnification of approximately 1:5 to 1:10.

In FIG. 7 the protective structure has a graphic coating or print of the pane element in the form of a so-called Mikado structure, whereby the coating element 13 containing the luminescent or phosphorescent pigments 19 is applied in the form of a Mikado structure on the pane element. Thus, in the enlarged view in FIG. 7 on the right irregular line structures result that appear dark to a bird's eye and between which transparent areas result.

Figure 8:
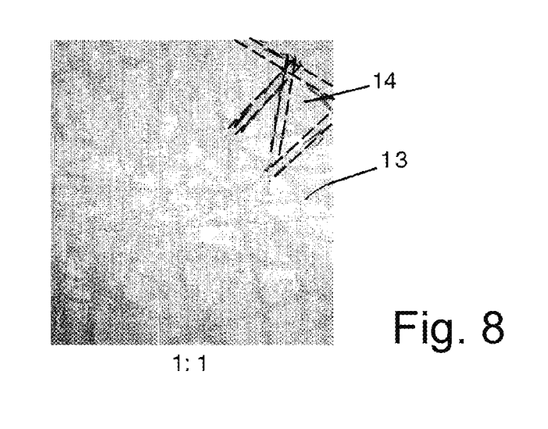
FIG. 8 shows the visible imprint of a pane coated with a protective device (with a protective structure poorly visible for the human eye).

According to FIG. 8, it is important that the human eye does not recognize the protective structure 13 according to FIG. 7 but rather that the transparent areas 14 dominate and therefore the protective structure 3 is practically invisible to the human eye.

For this reason in FIG. 8 the visible impression of the human eye is represented in such a manner that an almost transparent pane element results.

The applied graphic structures can also be provided in a negative shape in comparison to the drawings according to FIGS. 7, 5 and 6.

Figure 9:
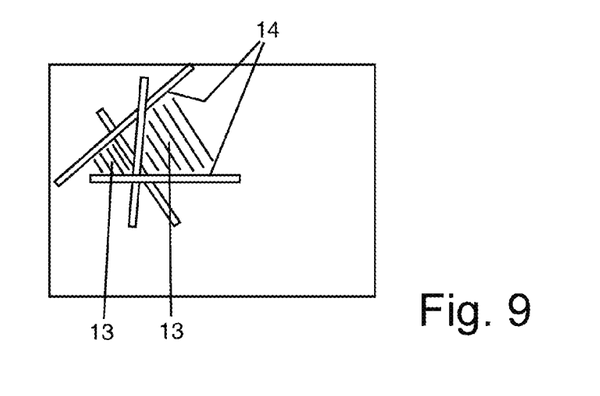
FIG. 9 shows the enlarged view of the Mikado structure according to FIG. 7.
Figure 10:
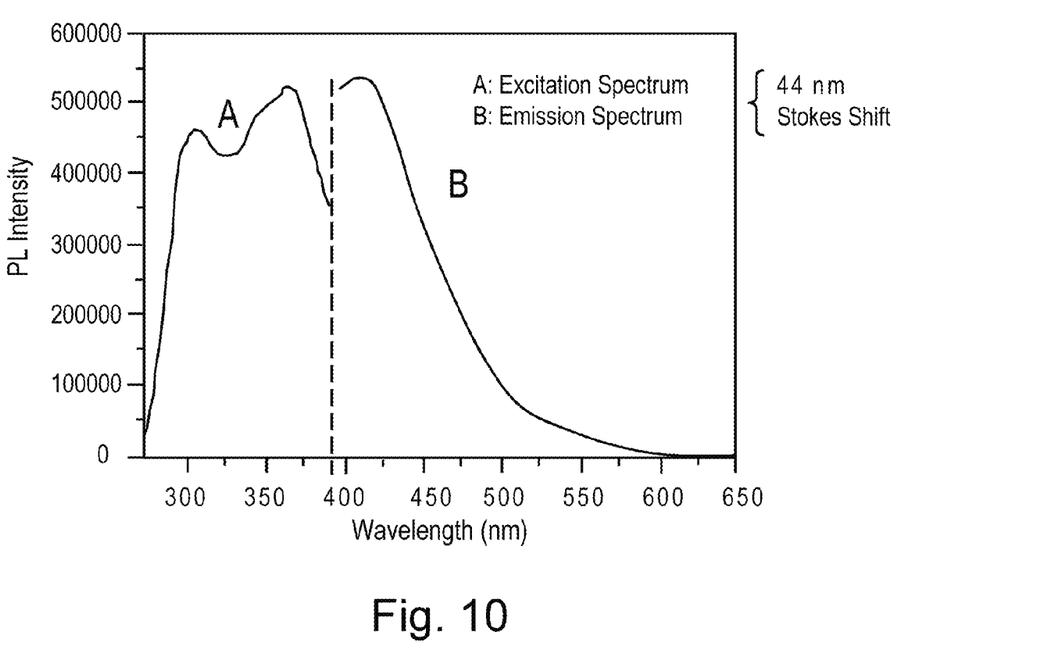
FIG. 10 shows the graphic view of the Stokes shift from the excitation spectrum A in the direction toward the emission spectrum B.
Figure 11:
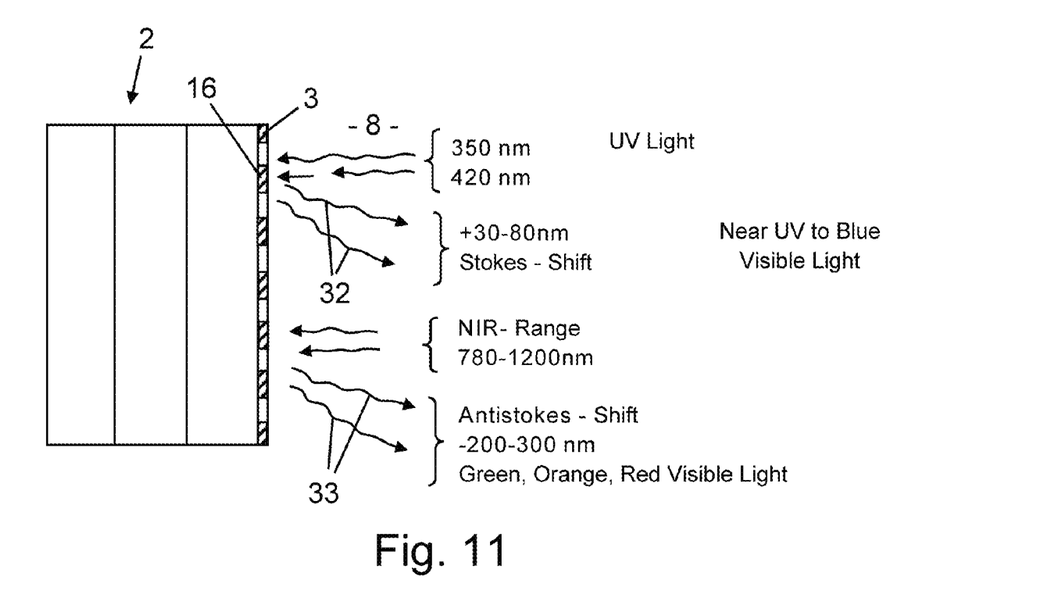
FIG. 11 shows the schematic view of the Stokes shift and of the anti-Stokes shift upon the effect of light on the anti-bird structure.

It can be recognized from FIG. 9 that in this instance the transparent areas 14 correspond to the Mikado structure 13 according to FIG. 7 and that the coating elements are then applied in the form of the transparent areas 14 shown in FIG. 7.

FIGS. 5 and 6 show other coating elements, namely, according to FIG. 5 the protective structure 3 carrying the pigments can also be designed as a stripe-shaped coating element 11 or, according to FIG. 6, as coating element 12 that is applied in the form of a spinning wheel.

Therefore, there is complete freedom in the graphical shaping of the protective structure 3 in accordance with the invention.

FIG. 4 shows the Stokes shift regarding luminescent ZnO nanoparticles.

The intensity of the light impression of the luminescent structure is indicated on the ordinate while the wavelength is indicated on the abscissa.

It can be readily recognized that in an excitation spectrum in the range between 0 to approximately 400 nanometers (blue light) the structure excited with luminescence in this manner emits in the longer wavelength range of the emission spectrum B.

Therefore, a Stokes shift of approximately 44 nanometers occurs, which has the result that the structure excited with daylight photons emits in the blue light range, which is readily visible for a bird's eye but is only poorly recognizable for the human eye.

Accordingly, the advantage is achieved with this technical teaching that the bird's eye perceives a strong contrast of the protective structure in contrast to the surroundings while the human eye does not perceive such a contrast but rather considers the previously cited pane elements to be transparent.

Figure 12:
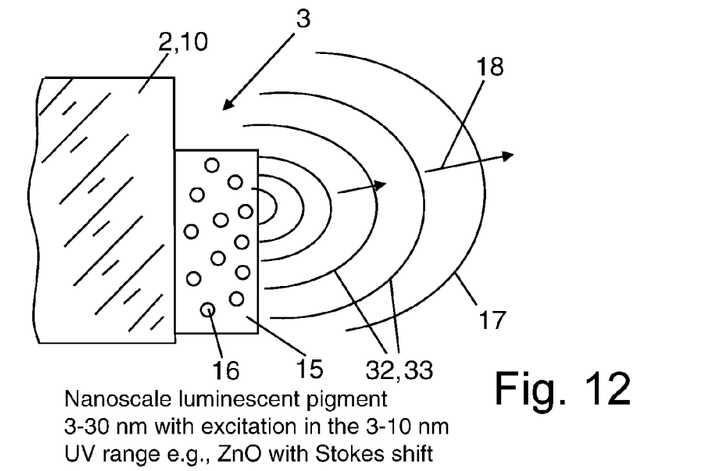
FIG. 12 schematically shows a view of the isotopic emission of a luminescent structure.

Therefore, FIG. 12 shows the basic principle of such an isotopic emission 17 of luminescent or phosphorescent pigments 16 bound in a protective structure 3 in a binder 15.

It is clear that the binder 15 must be substantially transparent in order to make possible at all an outward emission of the luminescent pigments 16 in the direction of arrow 18.

The emission takes place in the form of spherical waves (Lambert's radiator), i.e., in the form of an isotropic emission 17, whereby nanoscale luminescent pigments are used that are dimensioned approximately in the range of 3 to thirty nanometers and are preferably formed in the range of the 3 to 10 nm. Accordingly, when using ZnO pigments and excitation takes place with photons in the UV range with a Stokes shift into the blue range.

Figure 13:
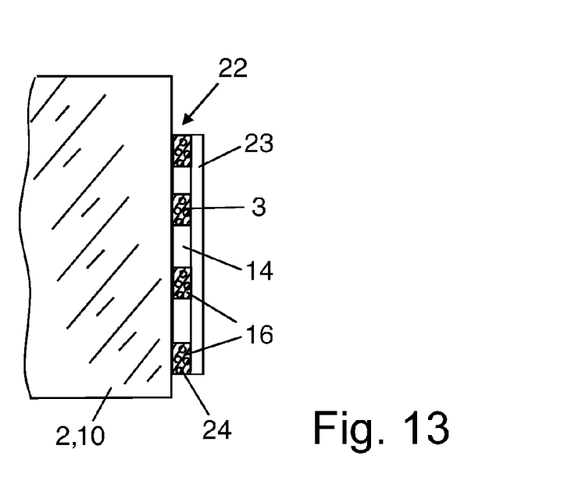
FIG. 13 shows an embodiment of the coating of an anti-bird structure modified in comparison to FIG. 11.

Furthermore, FIG. 13 shows that the protective structure 3 does not have to be applied directly onto the pane. It is sufficient to coat an adhesive sheet 22 on the back side with the protective structure 3 of the invention and to then adhere the latter onto the front side of the pane element 2 and/or 2/10.

This makes the arrangement weatherproof because the adhesive sheet 22 is covered on the weather side with a carrier sheet 23.

The protective structure 3 is embedded in the area of an adhesive mass 24 that at the same time brings the adhesive composite to the outside of the pane element 2, 10.

It was explained above that luminescent or phosphorescent pigments 16 are bound in a binder 15, whereby for the sake of simplicity only luminescent pigments 16 were mentioned even though the entire present specification also applies to phosphorescent pigments.

Figure 14:
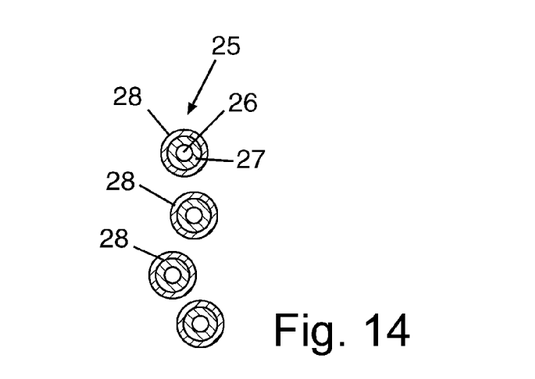
FIG. 14 shows a greatly enlarged view of luminescent pigments that are designed as hollow glass spheres and are bound in binders of the anti-bird structure.
Figure 15:
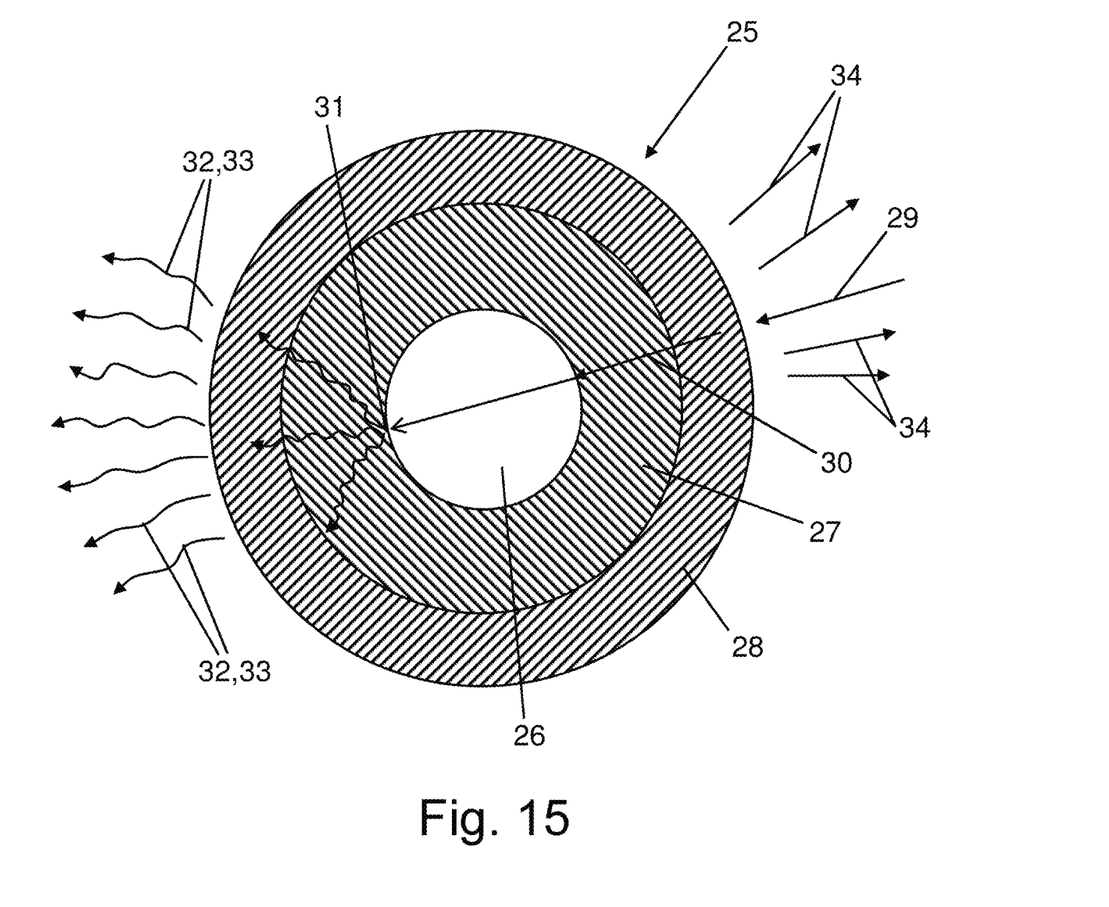
FIG. 15 shows the greatly enlarged view of a hollow glass sphere with luminescent outer casing according to FIG. 14.

FIGS. 14 and 15 show as a further embodiment that it is not necessary for the solution to integrate the pigments 16 directly into the binder 15, which binder must be constructed in such a manner in its transparency and its nature that it makes possible a photonic excitation of the pigments arranged in the binder and a corresponding emission to the outside.

FIGS. 14 and 15 show that is also not necessary for the solution to disperse the pigment themselves directly into the binder 15.

Carrier bodies can also be used that are constructed as hollow glass spheres 25 in the exemplary embodiment according to the FIGS. 14 and 15 that also result in a significant strengthening of the light impression of the emitted radiation.

The hollow glass spheres 25 have a diameter in the micrometer range, for example, with d50 of 5 μm or 10 μm of borosilicate glass and consist substantially of an inner, centric hollow space 26 that is preferably filled with air and of a spherical glass body 27 forming the spherical body.

According to the invention the glass body 27 is coated on its outer surface with the luminescent or phosphorescent coating 28 consisting of luminescent- or phosphorescent pigments 16.

FIG. 15 shows the mode of operation and the strengthening of the light impression in such a hollow glass sphere 25.

The light beam 29 impinging on the luminescent or phosphorescent coating 28 experiences at first a total reflection in the form of a reflected light 34 in accordance with FIG. 15 and is immediately reflected again to the outside.

However, a significant part of the light beam 29 penetrates through the coating 28 where it excites the luminescent or phosphorescent pigments 16 that are bound in there, whereby either an excited light 32 with a Stokes shift or selectively an excited light 33 with an anti-Stokes shift is emitted in accordance with the pigment type used.

It is important that a part of the light penetrates the luminescent or phosphorescent coating 28 of the hollow glass sphere 25 and meets the hollow space 26 in the direction of the arrow 30 and is diffusely split on the inside of this hollow space.

Therefore, the inner surface of the hollow space 26 in the glass body 27 acts as a diffuser 31 and the light rays that have been split up in many ways in this manner are distributed with a significantly greater effectiveness in the coating 28 and execute an emission of the excited pigments with a significantly greater power.

The luminescent radiation or phosphorescent radiation of such a hollow glass sphere 25 is approximately 30% higher than nanoscale luminescent or phosphorescent pigments 16 that are bound in a transparent or at least opaque binder.

It was previously indicated that in the framework of the present invention not only a Stokes shift of pigment structures in the direction of the blue range is claimed but in addition a so-called anti-Stokes shift is also claimed.

Such an anti-Stokes shift has the result that the daylight, that excites the pigment structure, is shifted into the shorter wave range so that the anti-bird structure emits in the green, orange or in the red light wave range, which for its part results in a strong colored impression to a bird's eye but is hardly visible to the human eye.

Also, luminescent pigments with Stokes shift as well as with anti-Stokes shift can be jointly arranged on a pane element, whereby either a placing on different areas of the pane structure is provided or a mixture or a spatial separation of the different pigment types.

It can also be provided that the inside of the pane is coated with another pigment type than, by way of comparison, the outside of the pane in order to combine in this manner the Stokes shift on the one side with the anti-Stokes shift on the other side.

LIST OF REFERENCE NUMERALS 1 pane element with protective device against bird strikes
2 pane element outside
3 protective structure
4 insulating glass composite
5 safety glass composite: ESG, TVG, TBG, VSG
6 inert gas
7 polymeric connecting element (PVB sheet or PVC sheet and the like)
8 outer area
9 inner area
10 pane element inside
11 coating element (stripes)
12 coating element (spinning wheel)
13 coating element (Mikado)
14 transparent area
15 binder
16 luminescent pigment or phosphorescent pigment
17 isotopic emission
18 arrow direction
19 bird
20 sun
21 arrow direction
22 adhesive sheet
23 carrier sheet
24 adhesive mass
25 hollow glass sphere
26 hollow space
27 glass body
28 coating
29 light ray
30 arrow direction
31 diffusor
32 excited light (Stokes)
33 excited light (anti-Stokes)
34 reflected light (autoreflection)

The invention claimed is:

1. A pane element with a protective structure against bird strikes in which a protective structure consisting of graphically designed coating elements is arranged on at least one side of a pane element, which protective structure is visible for a bird's eye as a hindrance that it cannot fly through and that is not visible to the human eye or is at least translucent, characterized in that in order to improve the contrast effect of the protective structure for the bird's eye luminescent pigments are mixed into the graphically designed coating elements, which pigments absorb daylight in the wavelength range of approximately 320 nm to 420 nm, and emit by Stokes shift in the (blue) UV range or in the near UV range into the visible wavelength longer wave range.

2. The pane element of claim 1 wherein the pigments absorb daylight in the wavelength range of approximately 350 nm to 380 nm.

3. A pane element with a protective structure against bird strikes in which a protective structure consisting of graphically designed coating elements is arranged on at least one side of a pane element, which protective structure is visible for a bird's eye as a hindrance that it cannot fly through and that is not visible to the human eye or is at least translucent, characterized in that in order to improve the contrast effect of the protective structure for the bird's eye luminescent pigments are mixed into the graphically designed coating elements, which pigments absorb daylight in the wavelength range of approximately 780 nm to 1200 nm and emit by anti-Stokes shift in the green, orange or in the red shorter wave range.

4. The pane element according to claim 3, characterized in that the luminescent pigments form the outer coating of hollow glass spheres, which hollow glass spheres are mixed into the printed elements.

5. The pane element according to claim 3, characterized in that the protective structure is arranged on the outer side of the glass with a graphic design by serigraphy or inkjet printing or aerosol jet printing or dispenser application or roller printing with a structured roller and is resistant to the environment.

6. The pane element according to claim 3, characterized in that the protective structure on the basis of a paste or ink is arranged on at least one glass side, whereby microcrystalline luminescent pigments with dimensions in the range of 0.5 μm to 30 μm, in particular 1 μm to 10 μm and quite especially 1 to 5 μm average pigment dimension are mixed in a largely transparent binder matrix of glass flux or glass frits.

7. The pane element according to claim 6, characterized in that the luminescent pigments with a UV absorption quality or a near UV absorption quality and with a UV emission quality or near UV emission quality are contained in a largely homogenously dispersed manner in the protective structure, and that the protective structure is burned during the course of an ESG process at approximately 620° C. and has a layer thickness in the range of the D90 dimension of the luminescent pigments.

8. The pane element according to claim 3, characterized in that the protective structure on the basis of a metallo-organic sol gel paste or ink is arranged on the outside of the glass, whereby nanoscale luminescent pigments with a UV absorption quality or near UV absorption quality and a UV emission quality or a near UV emission quality are contained dispersed in a largely homogeneous manner in the sol gel, and is burned at least at a temperature of 540° C. in particular jointly in the course of an ESG process at approximately 620° C. and has a layer thickness in the sub-micrometer range down to below 500 nm thickness.

9. The pane element according to claim 3, characterized in that the protective structure is arranged on at least one side of an insulating glass composite or of a single-pane safety glass (ESG) or of a partially prestressed glass (TV G) or of a thermally treated glass (TBG) or of a composite safety glass (VSG).

10. The pane element according to claim 3, characterized in that the pane element is constructed in a spatially formed manner.

* * * * *